United States Patent

[11] 3,627,055

[72] Inventor Michael T. Lay
West Chicago, Ill.
[21] Appl. No. 842,597
[22] Filed July 17, 1969
[45] Patented Dec. 14, 1971
[73] Assignee G. W. Murphy Idustries, Inc.

[54] LAWN EDGER WITH GUIDING DEVICE
6 Claims, 6 Drawing Figs.

[52] U.S. Cl. ................................................ 172/14,
172/17, 56/256
[51] Int. Cl. .......................................................... A01b 45/00
[50] Field of Search .......................................... 172/13, 14,
41, 15, 16, 17, 18, 35, 42; 271/52, 59; 56/25.4;
30/276

[56] References Cited
UNITED STATES PATENTS
2,608,043 8/1952 Berdan ......................... 56/25.4

| 2,718,742 | 9/1955 | Tangeman.................... | 30/276 |
| 2,791,875 | 5/1957 | Faas ............................ | 172/14 |
| 2,819,078 | 1/1958 | Durand ....................... | 271/52 |
| 2,938,323 | 5/1960 | Livingston................... | 56/25.4 |
| 3,350,864 | 11/1967 | Sheps et al................... | 172/14 |
| 3,370,844 | 2/1968 | Roberts........................ | 271/52 |
| 3,516,656 | 6/1970 | Sherman ..................... | 271/59 |

Primary Examiner—Robert E. Pulfrey
Assistant Examiner—C. W. Hanor
Attorney—Hofgren, Wegner, Allen, Stellman & McCord ABSTRACT: An inwardly turned wheel is used as part of the carriage for a lawn edger having a guide plate for guiding along a pavement edge. The wheel functions to retain the guide plate against the pavement edge. In one form, the wheel is mounted for pivotal movement between its turned position and a straight ahead position and turns to the straight ahead position during backward movement of the carriage.

Patented Dec. 14, 1971

INVENTOR
Michael T. Lay
BY Hofgren, Wegner, Allen, Stellman & McCord
ATTORNEYS

Patented Dec. 14, 1971
3,627,055
2 Sheets-Sheet 2
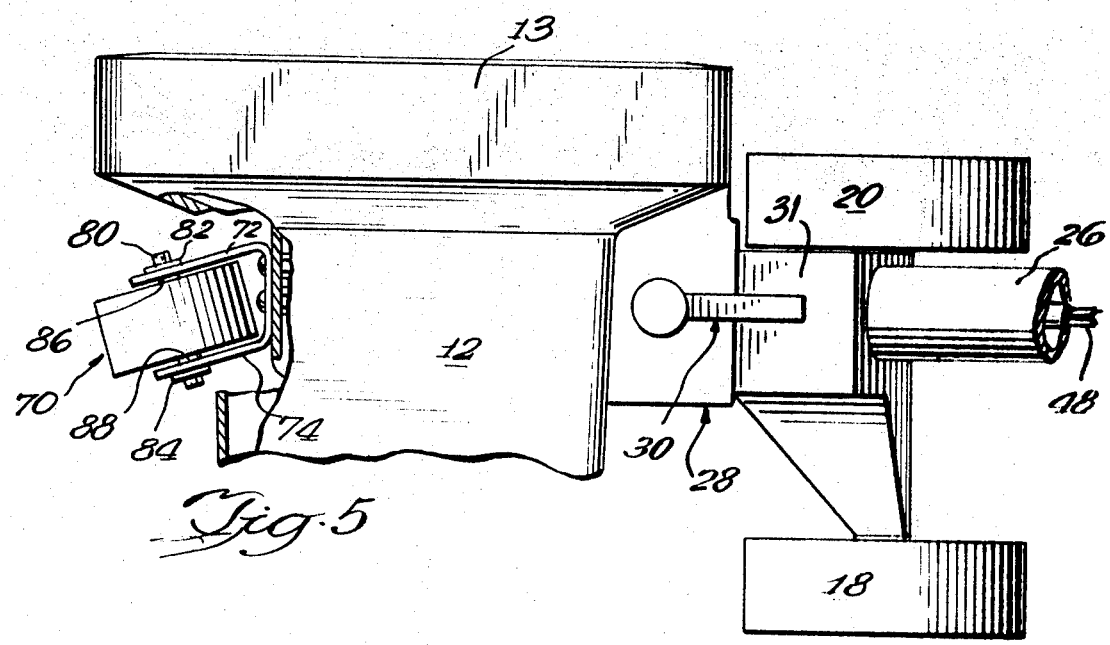
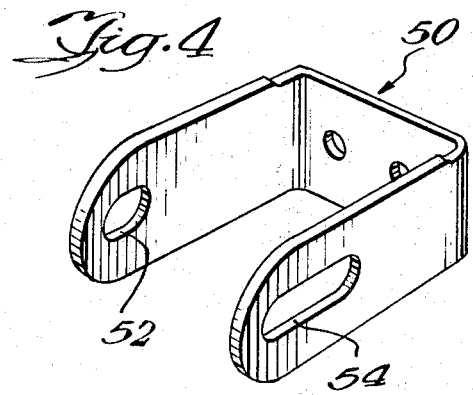
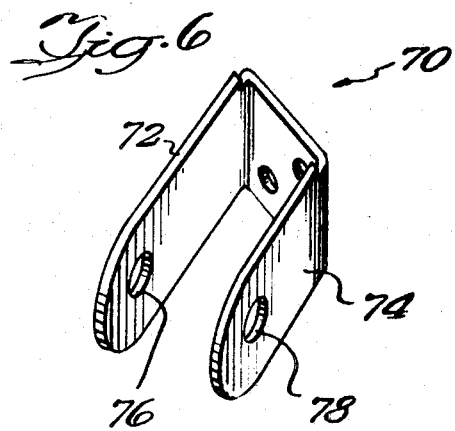
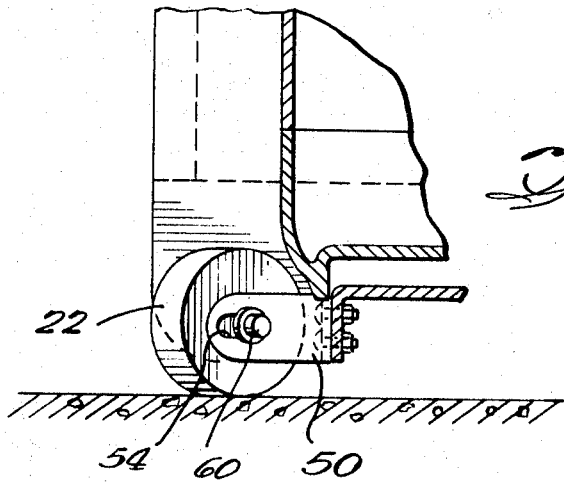

LAWN EDGER WITH GUIDING DEVICE

BACKGROUND OF THE INVENTION

1. Field of the Invention

This invention relates to an edger for edging a lawn and especially to a lawn edger having means for guiding along the edge of a pavement or the like to guide its travel.

2. Brief Description of the Prior Art

Lawn edgers are often provided with guide plates mounted parallel to the edging blade for blocking the edging blade from contacting the pavement edge and for guiding the device along the pavement edge.

Such devices had a regular guide wheel on the front mounted on an axle parallel to the axle of the pair of rear wheels. Accordingly, the cutting action of the edger blades along the edge of the curb or walk attempted to pull the edger away from the curb or walk so that the operator continually fought to keep the guide against the curb or walk, otherwise a meandering cut resulted.

SUMMARY OF THE INVENTION

The present invention provides a device for positive guidance of a lawn edger along the edge of a pavement such as a curb, driveway, sidewalk or the like.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

BRIEF DESCRIPTION OF THE DRAWINGS

FIG. 3 is a section along line 3—3 of FIG. 2.

FIG. 4 is an enlarged perspective view of a wheel mounting bracket used in the device of FIGS. 1 through 3.

FIG. 5 is a fragmentary top plan view with a portion of the casing removed illustrating another form of the device, and FIG. 6 is a perspective view of a wheel mounting bracket used in the form of the device shown in FIG. 5.

DESCRIPTION OF THE PREFERRED EMBODIMENTS

Figure 1:
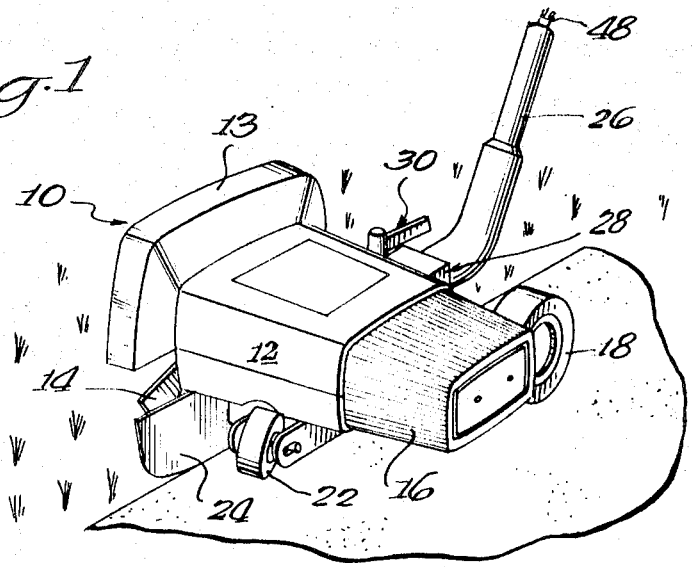
FIG. 1 is a perspective view of an edger trimmer embodying a form of the present invention.
Figure 2:
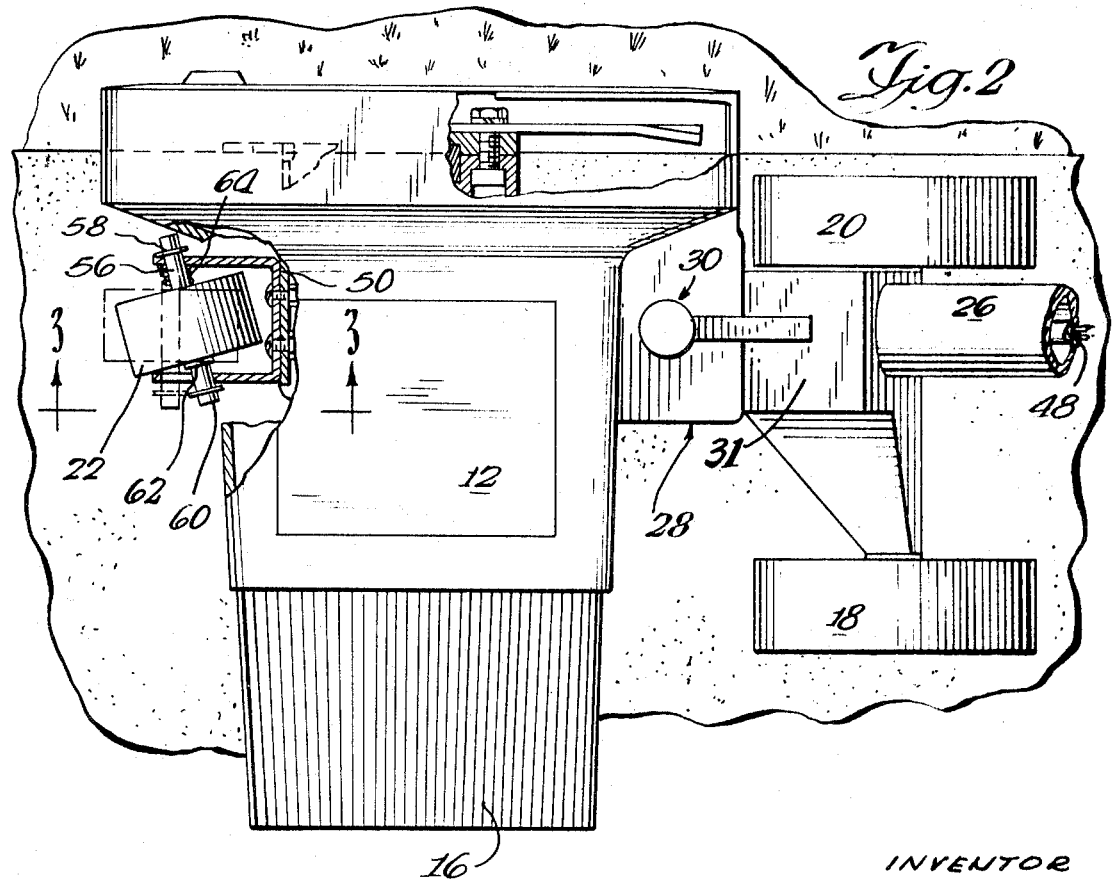
FIG. 2 is an enlarged top plan view of the device of FIG. 1 with portions of the casing removed to show orientation of various elements.

Turning first to FIG. 1, an embodiment of the edger of this invention is shown generally at 10. Edger 10 has a suitable plastic or metal casing or carriage portion 12 including a blade guard portion 13 for guarding a metal cutting blade 14 and a vented portion 16 containing an electric motor. Casing 12 is supported on two rear wheels 18 and 20 (FIGS. 2 and 5) and a front wheel 22 (FIGS. 1, 2 and 5) which is turned at an angle away from the blade during forward travel of the device. A metal or plastic guide plate 24 is mounted on the casing 12 for guiding along the edge of a pavement, such as a sidewalk, driveway or the like during a lawn edging operation. During trimming operations, plate 24 protects against objects which may be thrown by blade 14. A preferred manner of mounting guide plate 24 on casing 12 is shown in my copending application Ser. No. 842,598 filed July 17, 1969.

A tubular metal handle 26 is connected to casing 12 through a pivotal connection as at 28, provided with a locking device 30. Pivotal connection 28 permits pivoting of the casing 12 with the associated blade 14 between positions 90° apart for reorienting the casing 12 and blade 14 between edger and trimmer operating positions. The locking device 30 secures the casing 12 and blade 14 in either position. A preferred pivotal connection and locking device system is described in my copending application Ser. No. 842,602 filed July 17, 1969.

The electric motor in vented casing portion 16 is mounted on a motor and drive train mounting frame for driving blade 14 through an electrically insulating slip clutch 44. A preferred form of slip clutch is described in my copending application Ser. No. 842,602 filed July 17, 1969. The electric cord 48 for supplying electrical energy for the motor is contained within handle 26 and extends from handle 26 at the upper end thereof in a normal manner for plugging into a suitable electric outlet.

In operation of the device thus far described, the motor is turned on by a suitable switch (not shown) adjacent the upper end of handle 26 and, in the position shown in FIG. 1, the device is used for edging pavement and the like. Plate 24 guides along an edge of the pavement in the manner shown in FIG. 1, while blade 14 rotates to dig and cut adjacent plate 24 to produce a neatly edged lawn along the pavement. The device can be converted to a trimmer for trimming around trees, shrubs, and the like, by loosening locking device 30 and rotating or pivoting casing 12 counterclockwise 90° relative to the handle 26 as viewed in FIG. 1 and retightening locking device 30. Rear wheels 18 and 20 are part of a second carriage portion 31 stationarily secured to handle 26 and which, together with the casing 12, defines a carriage means. When operating as an edger, the angularly disposed front wheel 22 advantageously helps keep guide plate 24 against the edge of the sidewalk. When operating as a trimmer, front wheel 22, which is mounted on casing 12, is rendered inoperative since it has been moved 90° relative to wheels 18 and 20 with casing 12 to a nonfunctional position in which a scalp guard molded on the outer face of blade guard 13 is adapted to engage the ground to prevent scalping the lawn or the like.

A preferred form of the front wheel mounting is illustrated in FIGS. 1 through 4. A bifurcated bracket 50 is secured by suitable screws to casing 12. Bracket 50 has opposing slots 52 and 54 on the bracket arms for receiving an axle 56 on which wheel 22 is mounted for rotation. Retaining rings 58 and 60 are provided to retain axle 56 in the bracket. Slot 54 is longer than slot 52 so that axle 56 can pivot about its impalement at slot 52 a distance limited by the length of slot 54. A compression spring 64 is mounted on axle 56 between the arm of bracket 50 at slot 52 and wheel 22 to normally urge wheel 22 against a retaining ring 62 on axle 56 and to urge retaining ring 58 against bracket 50 at slot 52. Spring 64 also normally urges wheel 22 to its outwardly straight position relative to guide plate 24 as shown in dotted lines in FIG. 2. During forward movement of the edging device wheel 22 will pivot to the angular full line position of FIG. 2 to maintain guide plate 24 against the edge of the pavement. When the operator backs the device up, wheel 22 pivots under the urging of spring 64 to return to a straight position, as shown in dotted lines in FIG. 2, to permit a straight line backup movement of the device.

Turning to FIGS. 5 and 6, another form of front wheel mounting is shown. A bifurcated bracket 70 is mounted on casing 12. As shown in FIG. 5, the arms 72 and 74 of bracket 70 are acutely angularly disposed relative to the base portion of bracket 70 and outwardly relative to blade 14 and guide plate 24. Arms 72 and 74 have opposing bores 76 and 78 which receive axle 80 on which wheel 22 is mounted. Retaining rings 82 and 84 retain axle 80 against axial movement and spacer washers 86 and 88 are provided to keep wheel 22 generally centrally located between and spaced from arms 72 and 74. In operation of the device with the wheel mounted as in FIG. 5, during forward movement the device again keeps guide plate 24 against the pavement edge because of the inwardly turned wheel 22. During reverse operation downward pressure can be exerted on handle 26 to lift wheel 22 from the pavement for straight backup or, if straight backup is not required, the device can merely be pulled backward permitting guide plate 24 to move away from the pavement edge as directed by turned wheel 22.

I claim:

1. A device for edging a lawn comprising carriage means for moving along a sidewalk or the like, vertically disposed driven blade means extending below the carriage means for cutting the lawn adjacent the sidewalk, and guide means for guiding on the sidewalk edge, said carriage means including means positively retaining the guide means in guiding position against the sidewalk edge during forward travel of the carriage means and including wheel means for tending to turn said carriage means away from the sidewalk edge, said wheel means being pivotally mounted for movement between a straight position and a turned position relative to the sidewalk edge, means mounting the wheel means for pivotal movement comprising a bifurcated bracket having slots on opposing arms with the slot on the arm toward which the wheel turns away from the straight position being longer than the slot on the other arm and being of proper length to limit pivotal movement of the wheel means to the desired turned angle.

2. The device of claim 1 including compression spring means between the bracket arm having the shorter slot and the wheel means for normally urging the wheel means toward straight position, the compression of said spring being sufficiently low to be easily overcome upon forward movement of the carriage to permit the wheel means to turn to the angular position.

3. A device for edging a lawn comprising a carriage means having a pair of rear wheels for moving along a hard surface, vertically disposed driven blade means extending below the carriage means for cutting the lawn adjacent the hard surface, and guide means for guiding the device along the edge of the hard surface, said carriage means including means positively retaining the guide means in guiding position against the edge of the hard surface during forward travel of the carriage means and including wheel means for tending to turn said carriage means away from the sidewalk edge, mounting means on said carriage means for rotatably mounting said wheel means, said mounting means comprising a bifurcated bracket having openings in the opposing arms with the rear edge of the opening in the arm nearest the guide means being farther forward with respect to the carriage means than the rear edge of the opening in the other arm, an axle extending through said openings and through said wheel means for rotatably mounting said wheel means relative to said bracket, whereupon forward movement of the device positions the axle against the rear edges of said openings thereby tending to turn said guide means against the edge of the hard surface.

4. The device of claim 3 wherein said bifurcated bracket has forwardly directed angularly turned parallel arms, said arms being turned away from said guide means, and said opening in each arm being circular for holding said axle at a predetermined angle with respect to said carriage means.

5. The device of claim 4 wherein said guide means is a guide plate.

6. The device of claim 5 adapted for use as a trimmer wherein said carriage means has an elongated handle member and a pivotal connection between the handle member and a portion of the carriage means on which the retaining means is mounted for pivoting said carriage means and retaining means 90° relative to said handle member to dispose said blade means horizontally at the lower portion of the carriage means with said means being disposed horizontally over said blade means as a blade guard and said retaining means being in a nonfunctional position.

* * * * *